Oct. 19, 1965  D. G. WAY  3,212,369
WIRE STRIPPING DEVICES
Filed Dec. 17, 1962  6 Sheets-Sheet 1
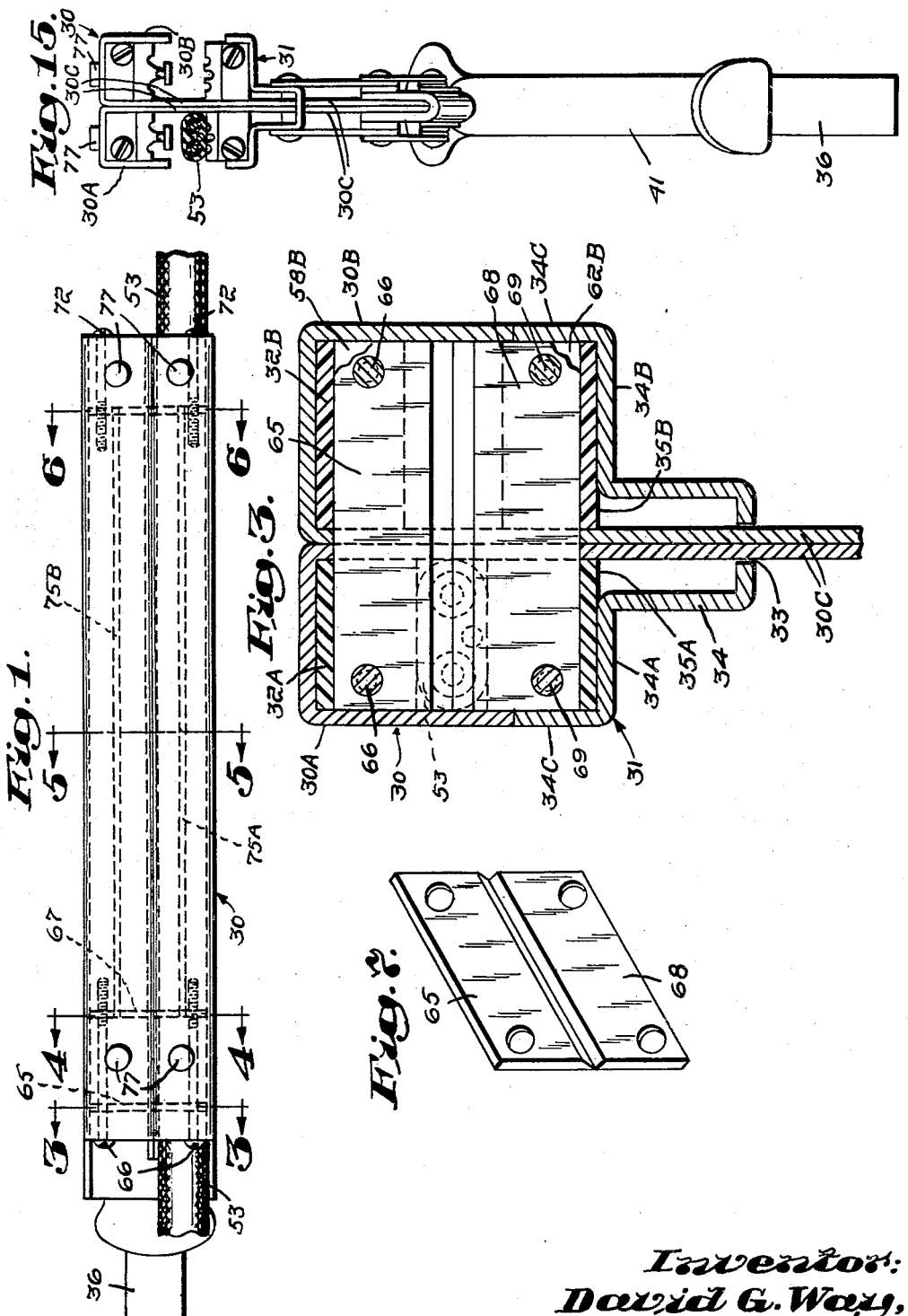
Inventor:
David G. Way,
by Abbot Spear
Attorney

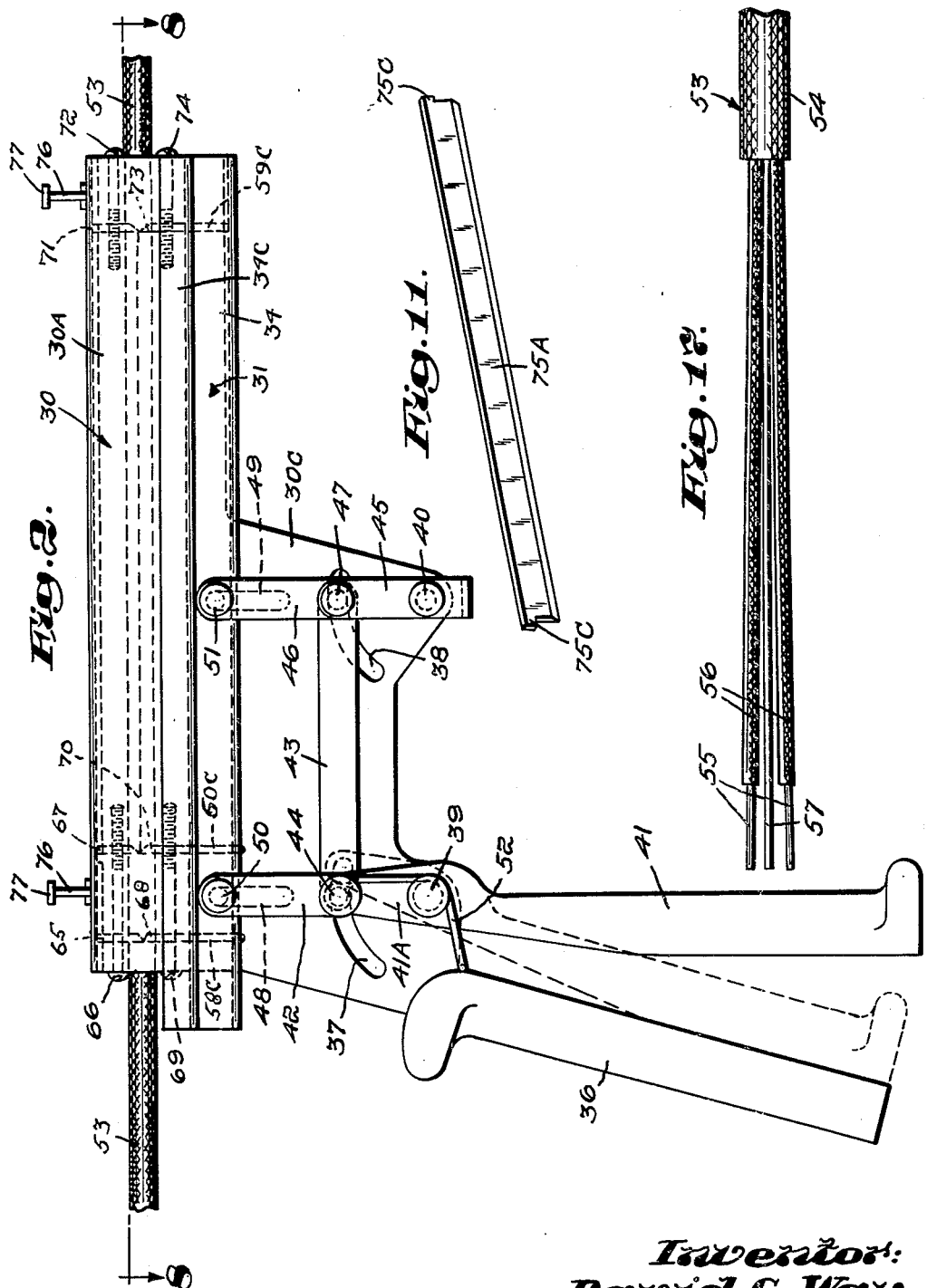

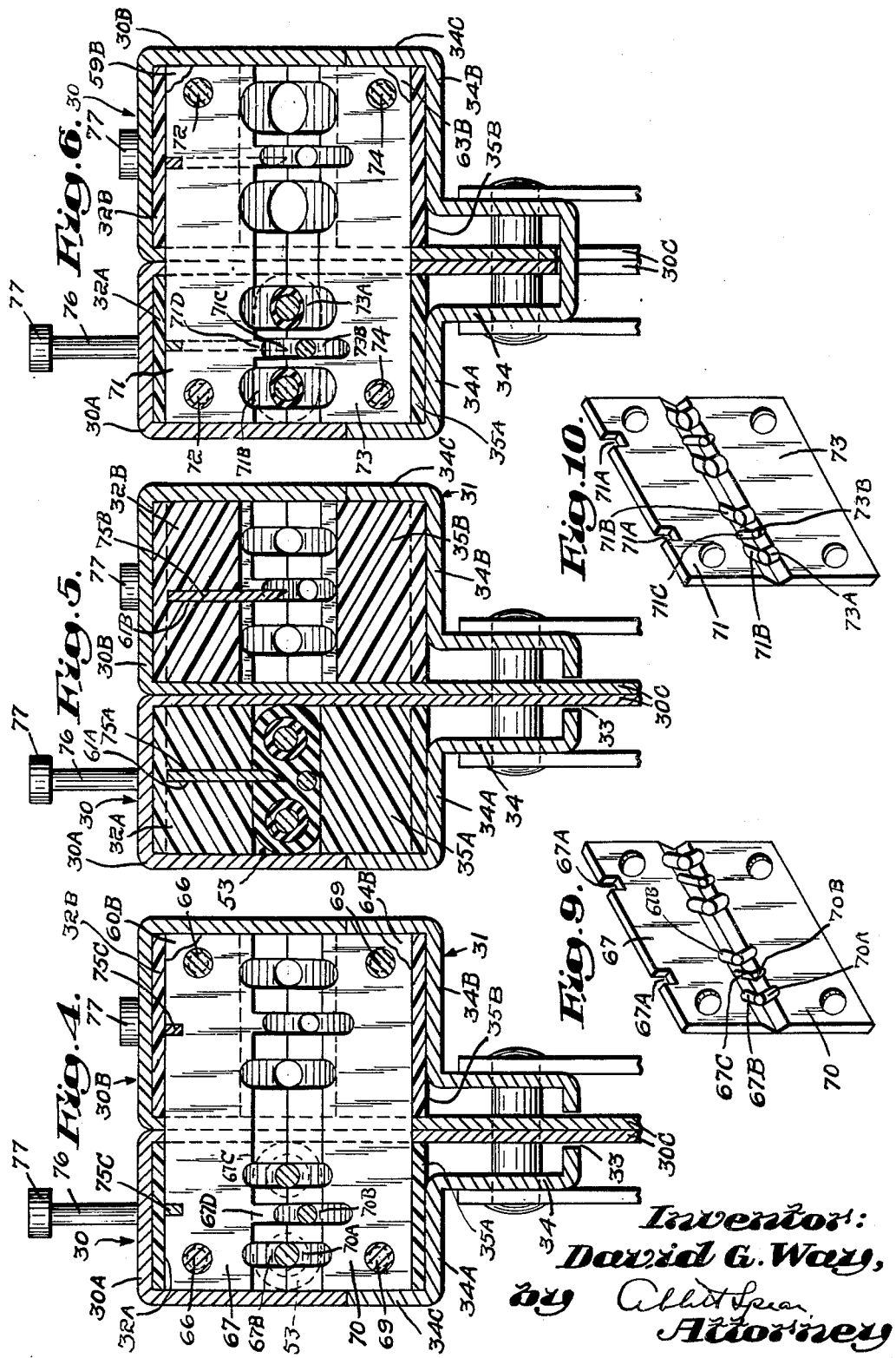

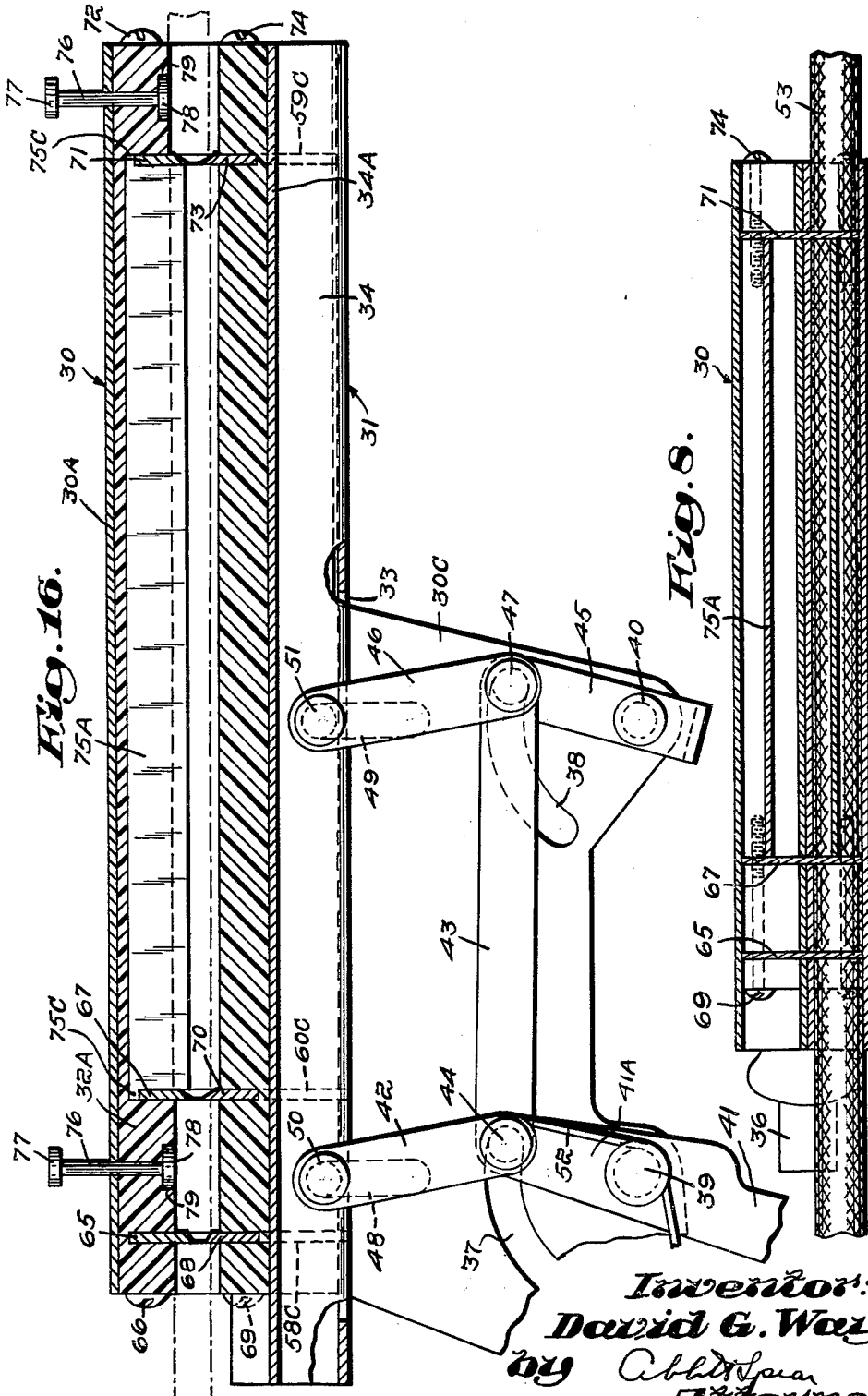

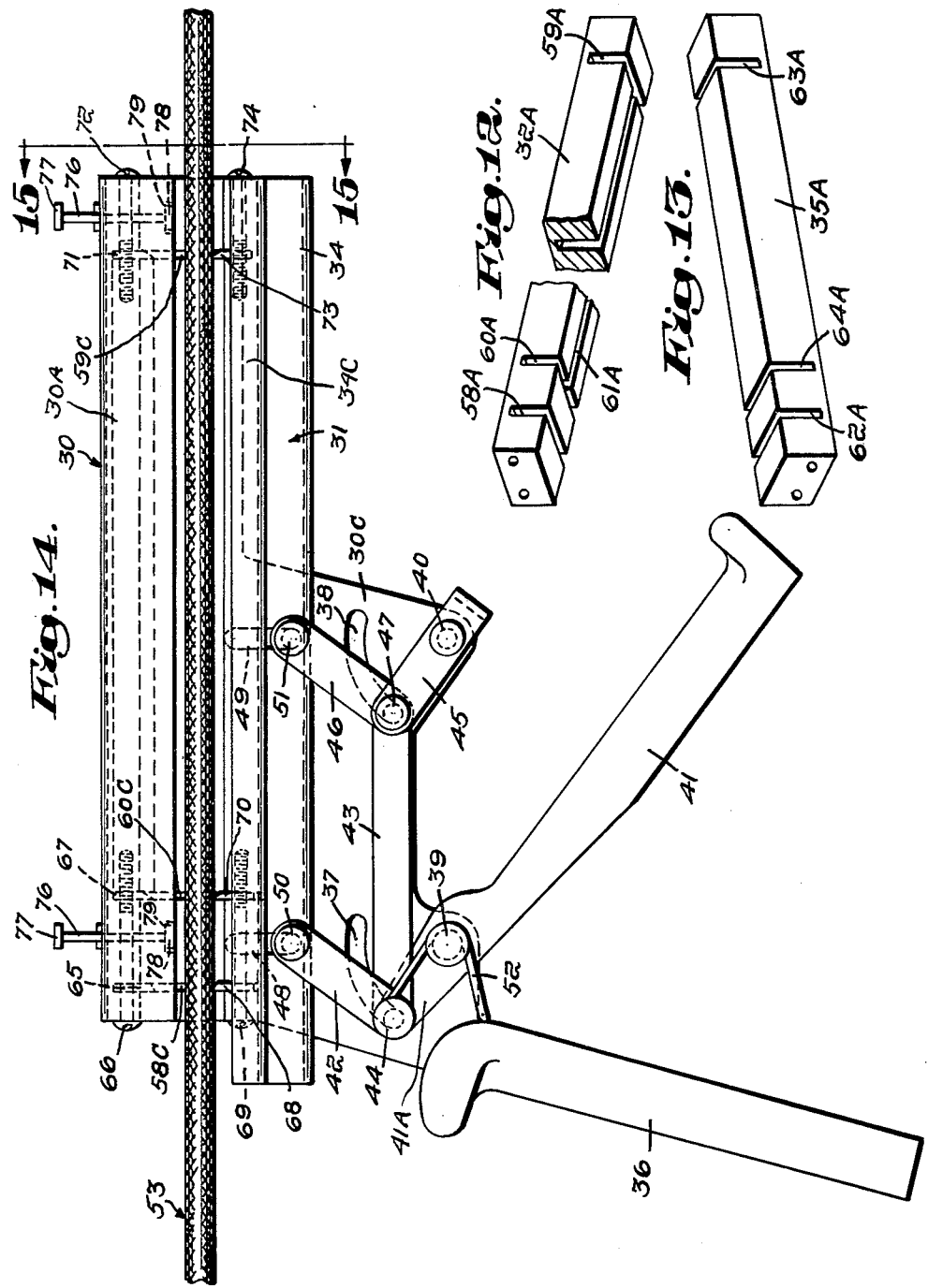

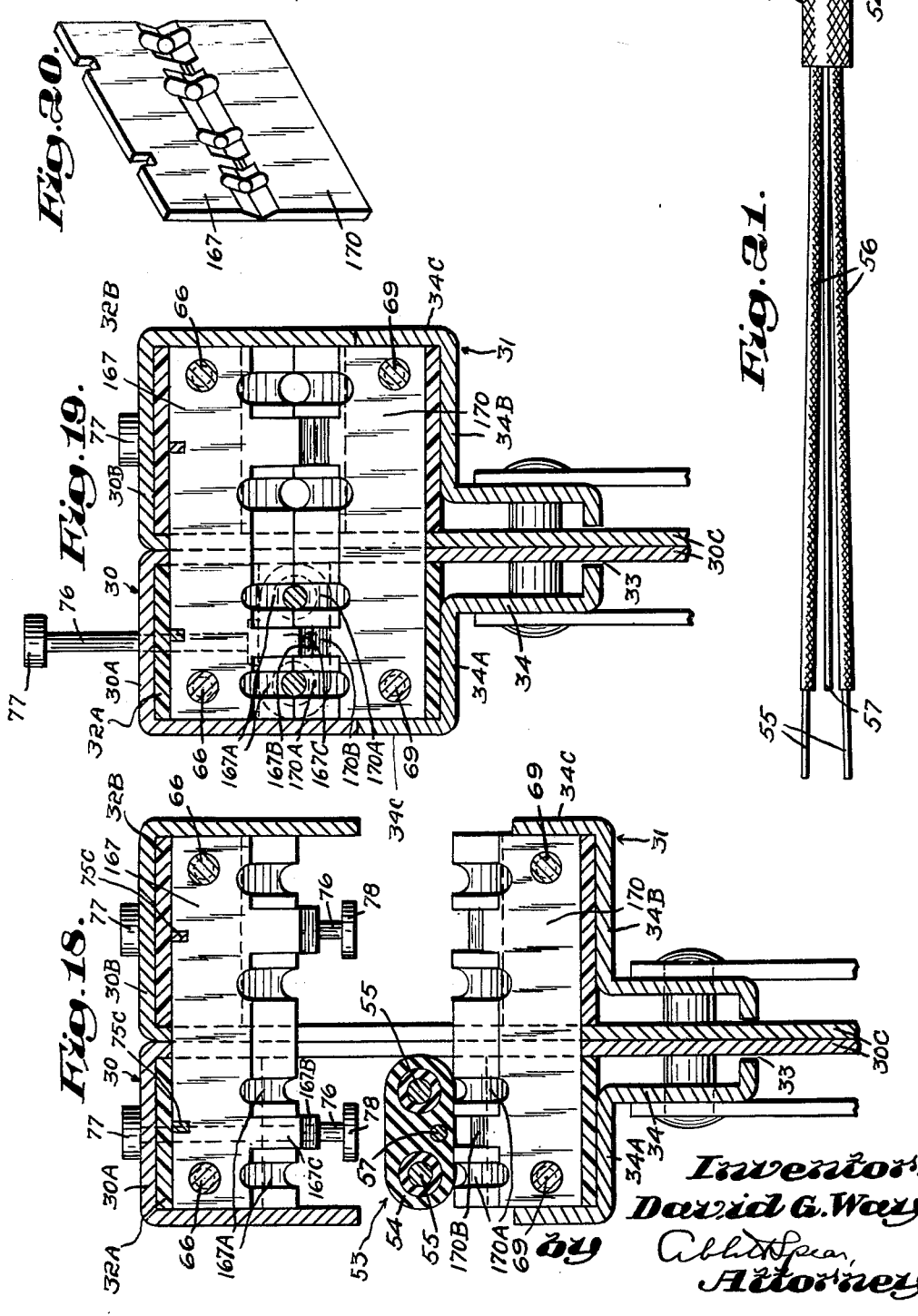

United States Patent Office 3,212,369
Patented Oct. 19, 1965

3,212,369
WIRE STRIPPING DEVICES
David G. Way, Boxborough, Mass.
(R.F.D., West Acton, Mass.)
Filed Dec. 17, 1962, Ser. No. 245,188
10 Claims. (Cl. 81—9.5)

The present invention relates to devices for stripping the end of a length of cable of the type having a sheath enclosing at least one insulated conductor.

In the manufacture of electrical or electrically operated equipment and in the wiring of buildings, cables of the above referred to type are widely used. These vary as to the number of conductors and while the invention enables any of them to be efficiently stripped, it is herein illustrated in connection with that particular type of cable having its sheath enclosing a pair of parallel insulated conductors and an intermediate ground conductor below the plane of the insulated conductors.

Any insulated conductor must have an end stripped so that a good electrical connection can be made with it. With any cable of the type with which the present invention is concerned, this essential operation takes considerable time and there is a real need for a device that enables a particular length of the sheath to be removed efficiently to expose the conductor or conductors and particularly for such a device that also enables the insulation of the insulated conductor or conductors to be similarly stripped.

The general objectives of the present invention are to provide wire stripping devices that meet the above generally indicated requirements and, in accordance with it, they are attained by means of devices, each including an upper section and a lower section with means interconnecting them for relative movement towards and away from each other to provide a cable receiving position and a closed, operative position. Each section has at least one lengthwise channel which, in the operative position, confines a length of cable. Both sections include a series of blades disposed transversely of the channels and corresponding blades coact, in the operative position of the device, on the confined length of cable with one pair of coacting blades transversely severing the sheath and another pair of coacting blades severing both the sheath and the insulation of the conductor or conductors. An additional pair of coacting blades may also be provided to sever the cable. The cutting means may also include a blade that extends longitudinally of the channel of one section between the sheath severing pair of blades and the pair of blades that also sever the conductor insulation, the function of the longitudinally extending blade being that of slitting the sheath approximately to the center thereof. If desired, the pair of blades coacting to sever the sheath and conductor insulation may also sever the ground wire.

As the pairs of blades coact while the cable is clamped between the sections, it is provided that the device may have a third position in which the sections are spaced slightly apart but with the blade pairs still positioned to serve to strip the material as the device is pulled lengthwise relatively to the cable.

In the accompanying drawings, there are shown illustrative embodiments of the invention from which these and other of its objectives, novel features, and advantages will be readily apparent.

In the drawings:

FIGURE 1 is a top elevational view of a wire stripping device in accordance with the invention, FIGURE 2 is a side view thereof, the device being shown in its cutting position, FIGURE 3 is a section taken along the indicated lines 3—3 of FIGURE 1 to show the severing of the cable, FIGURE 4 is a section taken along the indicated lines 4—4 of FIGURE 1 to show the severing of the cable sheath and the insulation of the insulated conductors, FIGURE 5 is a section taken along the indicated lines 5—5 of FIGURE 1 to illustrate the slitting of the cable sheath, FIGURE 6 is a section taken along the indicated lines 6—6 of FIGURE 1 to illustrate the cutting of the cable sheath, FIGURE 7 is a perspective view of the pair of blades that sever the cable, FIGURE 8 is a section taken approximately along the indicated lines 8—8 of FIGURE 2, FIGURE 9 is a perspective view of the pair of blades that sever both the sheath and the insulation of the insulated conductors, FIGURE 10 is a like view of the pair of blades that sever the cable sheath, FIGURE 11 is a perspective view of the sheath slitting blade, FIGURE 12 is a perspective and partly broken away view of one of the blade holders for the upper section, FIGURE 13 is a perspective view of one of the blade holders for the lower section, FIGURE 14 is a view similar to FIGURE 2 but with the device in its open, cable receiving position, FIGURE 15 is an end view taken approximately along the indicated lines 15—15 of FIGURE 14, FIGURE 16 is a fragmentary and partly sectioned side view of the device in its third or stripping position, FIGURE 17 is an elevational view of a stripped cable end, FIGURE 18 is a section corresponding to FIGURE 4 but illustrating a modification of the invention, the device being in its open, cable receiving position, FIGURE 19 is a similar section but with the device in its cutting position, FIGURE 20 is a perspective view of the pair of coacting blades used in the device illustrated by FIGURES 18 and 19, and FIGURE 21 is an elevational view of a cable end stripped by the device when using the blades shown in FIGURE 20.

The wire stripping device illustrated by the drawings has a receiver consisting of a generally indicated upper section 30 and a generally indicated lower section 31. The upper section 30 includes two channel members 30A and 30B, each of U-shaped section but with the channel member 30B being wider than the channel member 30A. The channel members 30A and 30B receive, respectively, blade holders 32A and 32B. As the blade holders 32A and 32B are identical except for their width and thickness, only the holder 32A is shown separately, see FIGURE 12.

The walls 30C of the members 30A and 30B extend downwardly, secured together in mutual contact as by welding, through a slot 33 in the bottom of the channel 34 of the lower section 31. The channel 34 terminates in upwardly disposed, outwardly extending shoulders 34A and 34B having upwardly disposed walls 34C and define, with the walls 30C, supporting channels for the blade holders 35A and 35B. As these are identical except for their width and thickness, only the holder 35A is separately shown, see FIGURE 13. The holders 35A and 35B are of the same width as the holders 32A and 32B, respectively.

The walls 30C support a pistol grip 36 and have longitudinally spaced, arcuate slots 37 and 38 below the lower section 31 concentric, respectively, with pivots 39 and 40. A trigger 41 has its forked end 41A attached to the walls 30C by the pivot 39 with links 42 and connecting members 43 connected to the forked end 41A by a pivot 44 extending through the arcuate slot 37. The connecting members 43 are connected to links 45 and 46 by a pivot 47 extending through the slot 38. The links 45 are attached to the walls 30C by the pivot 40.

The walls 30C also have longitudinally spaced vertical slots 48 and 49. A pivot 50 extends through the slot 48 and interconnects the links 42 and connects them to the channel 34 and a pivot 51 extends through the slot 49 and interconnects the links 46 and connects them to the channels 34. A U-shaped torsion spring 52 extends about the pivot 39 with one end anchored under the lower edges of the walls 30C adjacent to the pistol grip 36 and the other end anchored on and resiliently urging the pivot 44 toward the rearward extremity of the slot 37 thus positioning the links and connecting members to position the section 31 relative to the section 30 to establish the open position of the device illustrated by FIGURE 14 in which it may receive the generally indicated cable 53.

As the trigger 41 is pulled, the pivots 44 and 47 are advanced until the linkage brings the section 31 into cable-clamping relation to the section 30 to establish the operative position of the device, see FIGURE 2. When the pivots 44 and 47 reach the forward end of their respective slots, the linkage has pulled the section 31 slightly away from the section 30 to establish a third or stripping position of the device, see FIGURE 16.

While, as has been previously stated, the cables may be of other types, the cable 53, see FIGURE 17, is shown as having a sheath 54 housing parallel conductors 55 each having a layer 56 of insulation and a ground wire 57 positioned between but below the insulated conductors 55. The cable 53 is dimensioned to fit the channel 30A while the channel 30B will accommodate a cable of larger size which may be otherwise identical to the cable 53.

The blade holders 32A and 32B have transverse slots 58A and 58B, respectively, adjacent their rear ends, transverse slots 59A and 59B, respectively, adjacent their front ends, and intermediate slots 60A and 60B, respectively. The intermediate slots are relatively close to the rearward slots. The blade holders 32A and 32B are also shown as having longitudinal slots 61A and 61B, respectively. Each longitudinal slot extends from the intermediate slot of a respective one of the holders to the forward slot thereof. Corresponding transverse slots of the blade holders 32A and 32B are alined and the walls 30C are slotted as at 58C, 59C, and 60C to interconnect them thus to define three blade receiving slots of the upper section 30.

The blade holders 35A and 35B have transverse slots 62A and 62B, respectively, near their rear ends, transverse slots 63A and 63B, respectively, near their front ends, and intermediate slots 64A and 64B relatively close to the rearward slots. Corresponding slots are transversely alined and interconnected by the slots 58C, 59C, and 60C to define three blade receiving slots of the lower section 31 and these are in vertical alinement with corresponding slots of the upper section 30.

The slot established by the transversely alined slots 58A, 58B, and 58C receives a blade 65 secured to the blade holders 32A and 32B as by means of screws 66 which also anchor a blade 67 in the slot defined by the transversely alined slots 60A, 60B, and 60C. A blade 68 that is to coact with the blade 65 is located in the slot defined by the transversely alinged slots 62A, 62B, and 58C and is anchored in place by screws 69 also anchoring the blade 70 in the slot defined by the transversely alined slots 64A, 64B, and 60C for coaction with the blade 67. A blade 71 is anchored in the slot defined by the transversely alined slots 59A, 59B, and 59C by screws 72 for coaction with the blade 73 held in the slot defined by the transversely alined slots 63A, 63B, and 59C by screws 74. Blades 75A and 75B are held in the longitudinal slots 61A and 61B, respectively, by their end shoulders 75C which are entrant of appropriately located slots 67A and 71A of the blade 67 and 71, respectively. The several blades are all free with respect to the appropriate ones of the wall slots 58C, 59C, and 60C.

It will be noted from FIGURES 3 and 7 that the pair of blades 65 and 68 serve to sever a cable in either the channel 30A or the channel 30B.

As may best be seen in FIGURES 4 and 9, the blade 67 has, within the channel 30A, a recess 67B for each of the conductors 55 and a recess 67C in an intermediate projection 67D, the recess 67C being for the ground wire 57. The blade 70 has a recess 70A for each conductor 55 and a recess 70B for the ground wire 57. When the blades 67 and 70 are closed together, the sheath 54 and the insulation 56 of the conductors 55 are cut. The blades 67 and 70 have similarly recessed cutting edges exposed in the channel 30B.

As may best be seen in FIGURES 6 and 10, the blade 71 has a recess 71B for each insulated conductor and a recess 71C for the ground wire 57, the recess 71C being in the extremity of a projection 71D. The blade 73 has a recess 73A for each insulated conductor and an intermediate recess 73B for the ground wire 57. When the blades 71 and 73 are closed together, the sheath 54 is severed without cutting the insulation 56 and it will be noted that the several recesses define approximately ellipsoidal holes, the major axis of which is horizontal. The blades 71 and 73 have similarly recessed cutting edge portions in the chanel 30B. The ellipsoidal holes established by the recesses of the blades 71 and 73 eliminate failure that would result with blade recesses defining circular holes because, in that case, the compressible insulation would yield on engagement of the blades therewith to an extent defeating severance.

In the use of the device, the several pairs of blades coact as the sections 30 and 31 move into their closed operative position and then, on further rearward movement of the trigger 41, the sections 30 and 31 are moved into their third position relative to each other. In the third position, the pairs of blades are disengaged but remain in stripping position with the sections 30 and 31 spaced slightly apart so that the cable being stripped is not gripped thereby and the knives do not scrape the wire in one case, and the insulation in the other case. When the device is pulled lengthwise relative to the cable, the severed insulation layers and the sheath are stripped leaving an end of the cable ready for use, as illustrated by FIGURE 17.

Such stripping may leave the removed part of the sheath jammed in the upper section and, for that reason, ejectors are provided. These are shown in the form of pins 76 adjacent the ends of the channels of the section 30 and slidable vertically relative thereto. Each pin 76 has a head 77 and an ejector button 78 adapted to seat in a countersink 79 in the blade holders 32A, 32B.

In the device illustrated by FIGURES 18–20, the blades 67 and 70 are replaced by the pair of blades 167 and 170. The blade 167 has cutting edge recesses 167A for each of the insulated conductors and an intermediate cutting edge 167B on projection 167C. The blade 170 has a cutting edge recess 170A for each insulated conductor 55 and a recess 170B for the ground wire 57 and for coactive engagement with the edge 167B so that when the blades 167 and 170 are closed together, the sheath 54, the insulation layers 56 of the conductors 55 and the ground wire 57 are all cut as illustrated by FIGURE 21.

I claim:

1. In a device for stripping the end of a length of cable of the type having a sheath enclosing at least one insulated conductor, a receiver including upper and lower elongated sections, means interconnecting said sections for relative movement towards and away from each other to provide a cable receiving position, a closed operative position, and an intermediate stripping position, said sections in said operative position confining a length of cable, both of said sections including a series of blades disposed transversely of said sections, corresponding ones of said blades coating in said operative position on said confined length, one pair of coacting blades transversely severing said sheath and another pair of coacting blades severing both the sheath and the insulation of said conductor in said operative position, and actuating means connected to said interconnecting means and operable between two limits establishing said receiving position as one limit and, when actuated, first establishing said operative position and then said stripping position as the other limit.

2. In a device for severing a cable and stripping the severed end, the cable being of the type having a sheath enclosing at least one insulated conductor, a receiver including upper and lower elongated sections, means interconnecting said sections for relative movement towards and away from each other to provide a cable receiving position, a closed operative position, and an intermediate stripping position, said sections in said operative position confining a length of cable, both of said sections including a series of blades disposed transversely of said sections, corresponding ones of said blades coacting in said operative position on said confined length, one end pair of coacting blades transversely severing said sheath, another end pair of coacting blades severing said cable, and an intermediate pair of coacting blades severing both the sheath and the insulation of said conductor, and actuating means connected to said interconnecting means and operable between two limits establishing said receiving position as one limit and, when actuated, first establishing said operative position, and then said stripping position as the other limit.

3. In a device for severing a cable and stripping the severed end, the cable being of the type having a sheath enclosing at least one insulated conductor, a receiver including upper and lower elongated sections, means interconnecting said sections for relative movement towards and away from each other to provide a cable receiving position, a closed operative position, and an intermediate stripping position, said sections in said operative position confining a length of cable, both of said sections including a series of blades disposed transversely of said sections, corresponding ones of said blades coacting in said operative position on said confined length, one end pair of coacting blades transversely severing said sheath, another end pair of coacting blades severing said cable, and an intermediate pair of coacting blades severing both the sheath and the insulation of said conductor, and a blade extending lengthwise of and carried by one of said sections between said first named and said intermediate blade pairs, said lengthwise blade slicing said sheath in said operative position, and actuating means connected to said interconnecting means and operable between two limits establishing said receiving position as one limit and, when actuated, first establishing said operative position, and then said stripping position as the other limit.

4. In a device for stripping the end of a length of cable of the type having a sheath enclosing at least one insulated conductor, a receiver including upper and lower elongated sections, the upper section including a handle, a pivoted actuator, and pivoted linkage connecting the lower section thereto, said linkage including two pairs of links, pivot means interconnecting the links of each pair, and a link interconnecting the pivot means, a corresponding link of each pair being pivotally connected to said lower section, one of the other links being an actuator, said linkage, when actuated, moving said lower section relative to said upper section from a spaced apart cable receiving position into a closed position and then into a stripping position, said sections in said operative position confining a length of cable, both of said sections including a series of blades disposed transversely of said sections, corresponding ones of said blades coacting in said operative position on said confined length, one pair of coacting blades transversely severing said sheath and another pair of coacting blades severing both the sheath and the insulation of said conductor, said sections in said stripping position loosely confining said length with said blades in partial engagement with the severed material.

5. In a device for stripping the end of a length of cable of the type having a sheath enclosing a plurality of insulated conductors, said conductors being parallel, a receiver including upper and lower elongated sections, means interconnecting said sections for relative movement towards and away from each other to provide a cable receiving position and a closed operative position, each section including a lengthwise channel, the channels in said operative position confining a length of cable, both of said sections including a series of blades disposed transversely of said channels, corresponding ones of said blades coacting in said operative position on said confined length, both blades of each pair including a plurality of recessed portions constituting a part of their cutting edges, one portion for each insulated conductor, one pair of coacting blades having the recessed portions dimensioned to sever both the sheath and insulation of said conductors and the other pair having the recessed portions dimensioned to sever said sheath.

6. In a device for stripping the end of a length of cable of the type having a sheath enclosing two insulated conductors and a ground conductor between said pair of conductors but on one side of a plane common thereto, said conductors being parallel, a receiver including upper and lower elongated sections, means interconnecting said sections for relative movement towards and away from each other to provide a cable receiving position and a closed operative position, each section including a lengthwise channel, the channels in said operative position confining a length of cable, both of said sections including a series of blades disposed transversely of said channels, corresponding ones of said blades coacting in said operative position on said confined length, one blade of each pair including a plurality of recessed portions constituting a part of its cutting edge, one for each insulated conductor, and an intermediate portion to enter therebetween into proximity to the ground conductor and the other blade of each pair including like recessed portions and an intermediate recessed portion for said ground conductor constituting part of its cutting edge, one pair of coacting blades having the recessed portions dimensioned to transversely sever said sheath and another pair of coacting blades having the recessed portions dimensioned to sever both the sheath and the insulation of said insulated conductors.

7. In a device for stripping the end of a length of cable of the type having a sheath including at least one insulated conductor, a receiver including upper and lower elongated sections, the upper section including a handle, linkage interconnecting said sections and operable to permit vertical, parallel movement of said sections into and out of an operative, cable confining position, said receiver including cutting means operative in said operative position to have predetermined cutting effects on a length of cable to free a length of said sheath and a length of said sheath and of the insulation of the conductor between said sections, said linkage including an actuator pivoted to said handle, and means limiting the extent to which said actuator may be pivoted, in one limit, said sections being spaced apart to receive a length of said conductor, in the other limit, said sections being spaced apart with the cutting means in holding engagement with the freed sheath and insulation, said operative position being established by an intermediate position of said actuator.

8. In a device for stripping the end of a length of a cable of the type having a sheath including at least one insulated conductor, a receiver including upper and lower elongated sections, the upper section including a central depending wall, the lower section having a central lengthwise slot between them through which the wall extends, said wall including a handle below said slot, linkage interconnecting said wall below said slot and said lower section and operable to permit vertical, parallel relative movement of said sections into and out of an operative position confining a length of cable on either side of said wall and slot, said receiver including cutting means operative in said operative position to have predetermined cutting effects on a length of cable confined between said sections to free a length of said sheath and a length of said sheath and of the insulation of a conductor, said linkage including an actuator pivoted to said wall, and means limiting the extent to which said actuator may be pivoted, in one limit, said sections being spaced apart to receive a length of said conductor between them on either side of said wall and slot, in the other limit, said sections being spaced apart with the cutting means in holding engagement with the freed sheath and insulation, said operative position being established by an intermediate position of said actuator.

9. In a device for stripping the end of a length of cable of the type having a sheath enclosing a pair of insulated conductors and a ground conductor between said pair of conductors but on one side of a plane common thereto, said conductors being parallel, a receiver including upper and lower elongated sections, means interconnecting said sections for relative vertical, parallel movement towards and away from each other to provide a spaced-apart cable receiving position, and a closed operative position, said sections in said operative position confining a length of cable, both of said sections including a series of blades disposed transversely of said sections and detachably connected to appropriate ones of said end walls, corresponding ones of said blades coating in said operative position on said confined length, one blade of each pair including a plurality of recessed portions constituting a part of its cutting edge, one for each insulated conductor, and an intermediate portion to enter therebetween into proximity to the ground conductor and the other blade of each pair including like recessed portions and an intermediate recessed portion for said ground conductor constituting part of its cutting edge, one pair of coacting blades having the recessed portions dimensioned to transversely sever said sheath and another pair of coacting blades having the recessed portions dimensioned to sever both the sheath and the insulation of said insulated conductors, and a sheath severing blade extending lengthwise of one section between said two pair of blades.

10. The device of claim 9 in which one section has an endwise slot for the sheath severing blade and the sheath severing blade includes end portions held against vertical movement by appropriate ones of the transversely disposed blades.

References Cited by the Examiner
UNITED STATES PATENTS

| | | |
|---|---|---|
| 893,132 | 7/08 | Bork. |
| 1,022,679 | 4/12 | Huston. |
| 1,475,273 | 11/23 | Bernard. |
| 1,515,536 | 11/24 | Armstrong _____ 81—124.1 |
| 1,632,004 | 6/27 | Hampton _____ 81—9.51 X |
| 2,054,973 | 9/36 | Ferguson. |
| 2,120,398 | 6/38 | Edwards et al. |
| 2,497,112 | 2/50 | Andren _____ 81—9.51 X |
| 2,521,688 | 9/50 | Cataldo et al. _____ 81—9.51 |
| 2,601,797 | 7/52 | Holt. |
| 2,627,768 | 2/53 | Cook. |
| 2,758,490 | 8/56 | Williams. |
| 2,929,284 | 3/60 | Hagstrand _____ 81—9.51 |

WILLIAM FELDMAN, *Primary Examiner.*